United States Patent [19]
Koa

[11] Patent Number: 5,830,560
[45] Date of Patent: Nov. 3, 1998

[54] ADJUSTABLE ACCESSORY FLOOR MAT SYSTEM FOR VEHICLES

[76] Inventor: Jiann Y. Koa, 7 Monona Ct., Rockville, Md. 20855

[21] Appl. No.: 802,237

[22] Filed: Feb. 19, 1997

[51] Int. Cl.⁶ .............................. B32B 23/02; B62D 25/20
[52] U.S. Cl. ............................. 428/192; 428/45; 428/81; 428/88; 428/119; 296/97.23
[58] Field of Search ................................ 428/192, 88, 81, 428/45, 119; 296/97.23

[56] References Cited

U.S. PATENT DOCUMENTS

| | | | |
|---|---|---|---|
| 2,898,146 | 8/1959 | Yudenfreund | 296/36.1 |
| 4,741,065 | 5/1988 | Parkins | 15/217 |
| 4,828,898 | 5/1989 | Bailey | 428/95 |
| 5,626,933 | 5/1997 | Long | 428/88 |

*Primary Examiner*—Terrel Morris
*Attorney, Agent, or Firm*—Donald A. Kettlestrings

[57] ABSTRACT

An adjustable and removable accessory floor mat system for protecting different sizes and shapes of vehicle floors includes first and second flexible, flat mats having flexible walls extending upwardly from predetermined edges of the mats. A plurality of vehicle carpet engaging projections extend downwardly from predetermined areas of lower surfaces of the mats, and the mats are of predetermined dimensions whereby one mat can be positioned at least partially onto the other mat in an adjustable manner to provide a tray-like configuration.

19 Claims, 3 Drawing Sheets

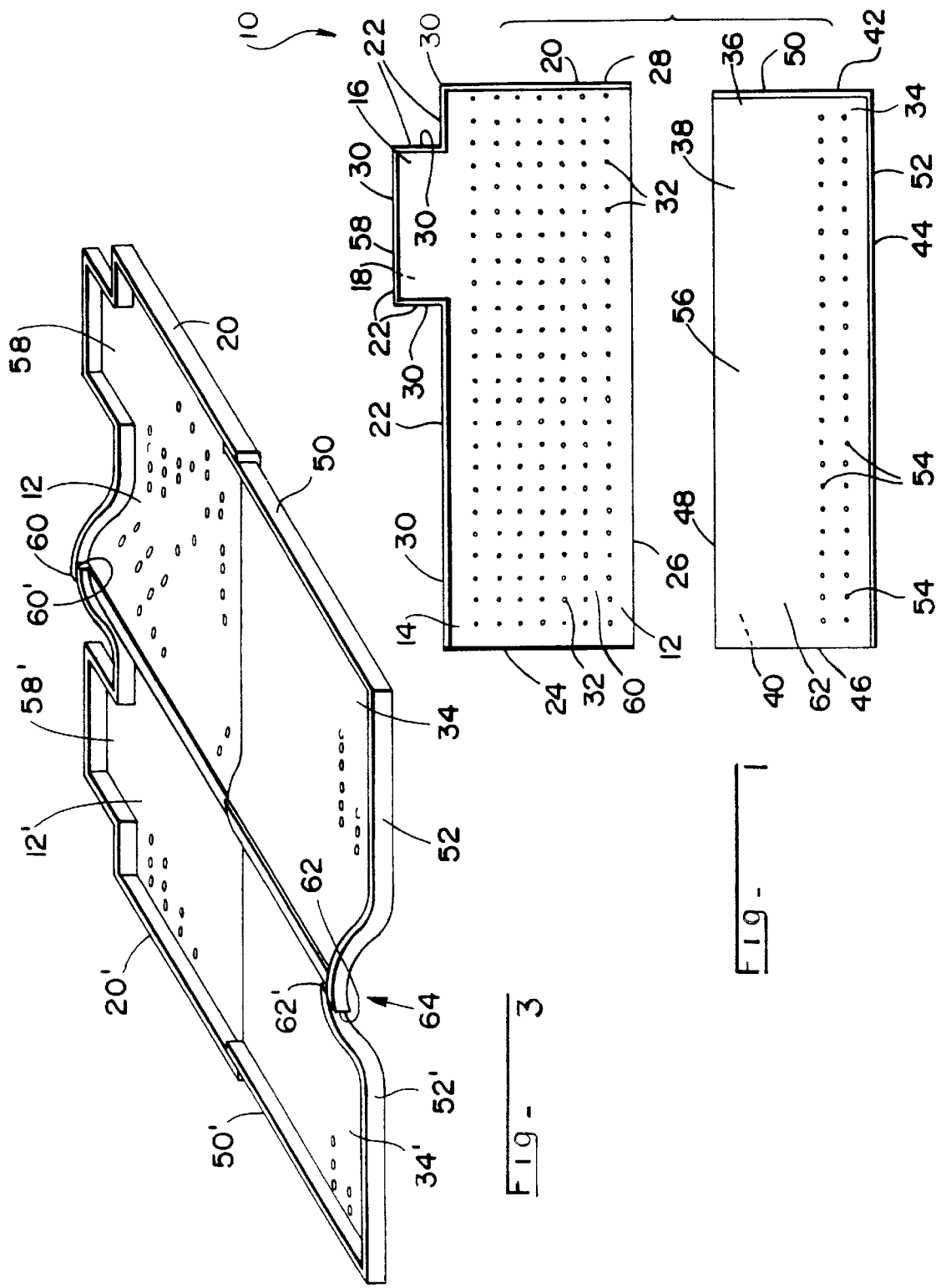

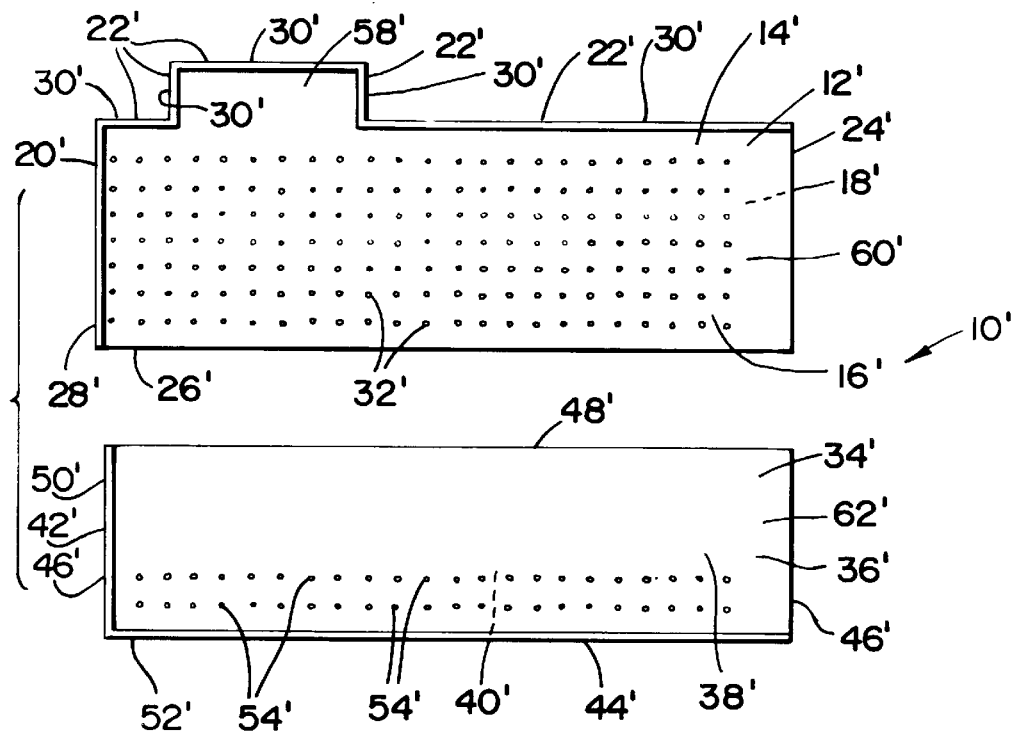
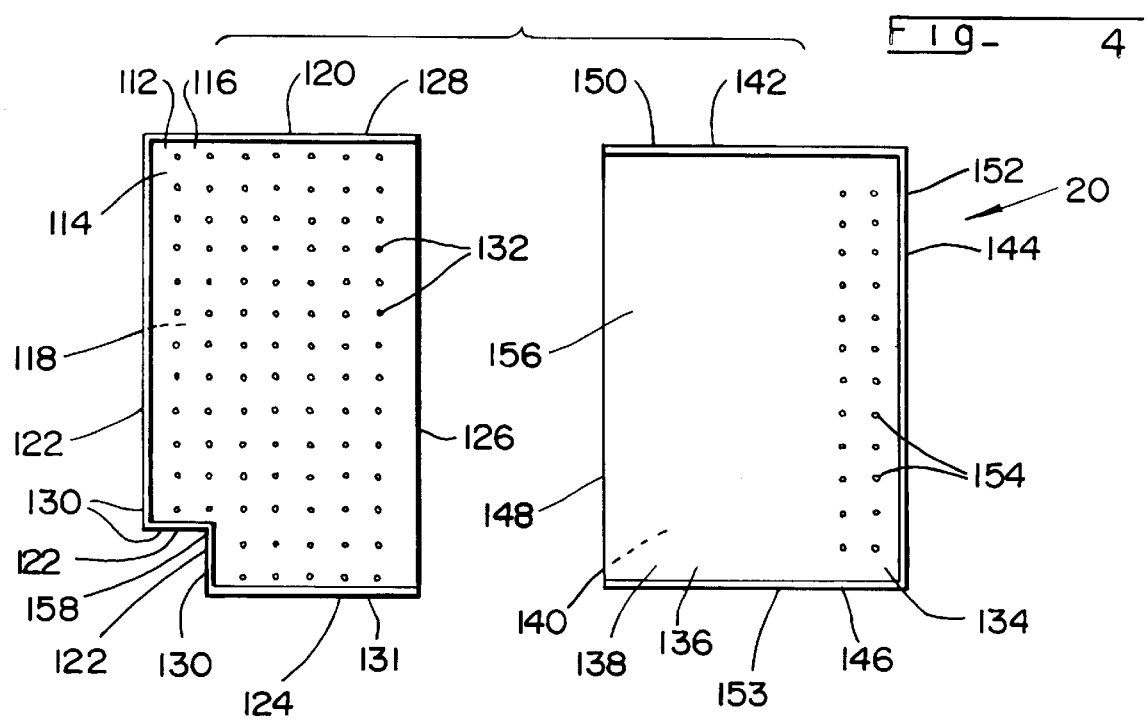

ADJUSTABLE ACCESSORY FLOOR MAT SYSTEM FOR VEHICLES

BACKGROUND OF THE INVENTION

This invention relates to mats for use in automobiles and other motor vehicles and more particularly to an adjustable and removable accessory floor mat system for protecting vehicle floors of different sizes and configurations.

Accessory floor mats are widely used to protect the carpeted floors of vehicles. The mats are typically made of an elastomeric material sufficiently flexible to generally conform to the variety of contours of vehicle floors.

Mats made by injection molding of thermoplastic materials and dimensioned for an exact fit to a particular vehicle floor are commercially available. Some of these mats have incorporated raised borders to trap dirt, water and snow. Some of these mats have also included a studded bottom surface to prevent slipping.

Although such mats have served the purpose for which they are designed, they have not proved entirely satisfactory because separate mats must be manufactured to fit and properly cover automobile floors of various sizes and configurations.

It is, therefore, an object of the present invention to provide an adjustable and removable accessory floor mat system for protecting floors of vehicles.

Another object is to provide such a system which is flexible to generally conform to the contours of various vehicle floor.

A further object of the invention is the provision of such a system which creates tray-like floor mats which can be quickly and easily adjusted to different sizes and shapes to accommodate different sizes and shapes of vehicle floors.

Still another object is to provide such a system which creates tray-like floor mats which prevent spilling of water and dirt off the sides of the mats during use and when they are removed from the vehicle.

Yet another object of the present invention is the provision of such a system which will not slide over a vehicle carpeted floor surface.

Still another object is to provide such a system which can be easily and inexpensively manufactured.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects, the present invention provides an adjustable and removable accessory floor mat system for protecting floors of vehicles, the system comprising: a first mat having a first normally flat, flexible base defining first upper and lower surfaces and first, second, third and fourth edges of predetermined dimensions; first and second flexible walls extending upwardly from the first and second edges, respectively; a first plurality of vehicle carpet engaging projections extending downwardly from the first lower surface of the first base; and second mat having a second normally flat, flexible base defining second upper and lower surfaces and fifth, sixth, seventh and eighth edges of predetermined dimensions; third and fourth flexible walls extending upwardly from the fifth and sixth edges, respectively; a second plurality of vehicle carpet engaging projections extending downwardly from the second lower surface of the second base; and wherein the predetermined dimensions of the fourth and eighth edges of the mats are predetermined lengthwise dimensions, whereby the second mat can be positioned at least partially onto the first mat with a portion of the second lower surface resting on a portion of the first upper surface.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate preferred embodiments of the invention and, together with the description, serve to explain the principles of the invention.

FIG. 1 is a top plan view of an embodiment of the floor mat system configured for use on the rear passenger's side floor of a vehicle;

FIG. 2 is a top plan view of an embodiment of the floor mat system configured for use on the rear driver's side floor of a vehicle;

FIG. 3 is a perspective view of the system embodiments of FIGS. 1 and 2 and showing the system embodiments in operative position on the rear floor of a vehicle with the mats partially overlapping each other;

FIG. 4 is a top plan view of an embodiment of the floor mat system configured for use on the front driver's side floor of a vehicle;

DESCRIPTION OF THE PREFERRED EMBODIMENTS

Figure 5:
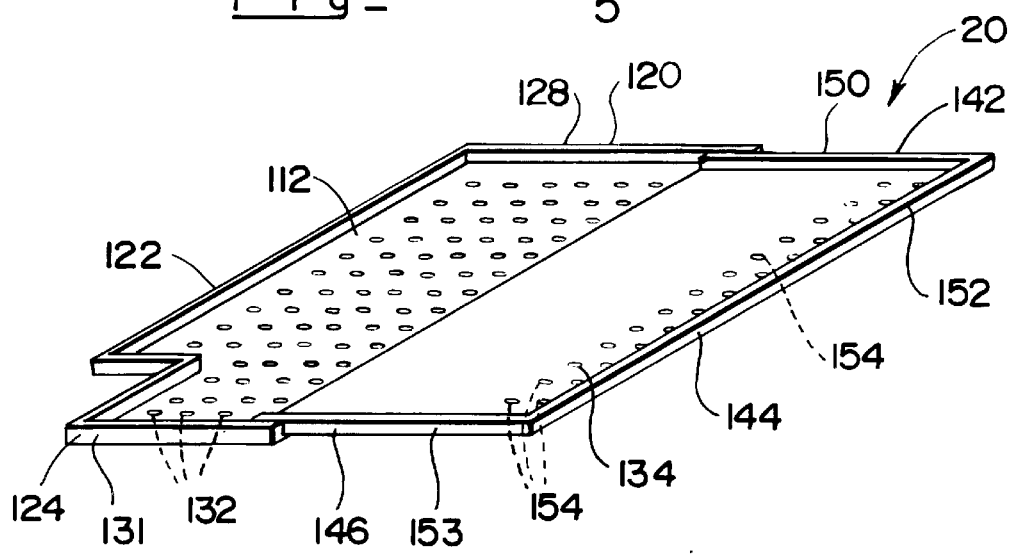
FIG. 5 is a perspective view of the system embodiment of FIG. 4 and showing the system embodiment in operative position with the mats partially overlapping each other.

With reference now to the drawings, wherein like reference characters designate like or corresponding parts throughout the several views, there is shown in FIGS. 1–3 a first embodiment of an adjustable and removable accessory floor mat system for protecting rear seat floors of automobiles.

In accordance with the invention, a floor mat system 10 for protecting rear seat, passenger's side floors of vehicles is shown in FIG. 1 and a system 10' for protecting rear seat, driver's side floors of vehicles is shown in FIG. 2.

With reference now to the embodiment shown in FIGS. 1 and 2, floor mat system 10 includes a first mat 12 having a first normally flat, flexible base 14 defining first upper and lower surfaces 16, 18, respectively. Mat 12 defines first, second, third and fourth edges 20, 22, 24 and 26, respectively, of predetermined dimensions. First and second flexible walls 28, 30 extend upwardly from first and second edges 20, 22, respectively.

A first plurality of vehicle carpet engaging projections or nubs 32 extend downwardly from first lower surface 18 of first base 14.

Floor mat system 10 further includes a second mat 34 having a second normally flat, flexible base 36 which defines second upper and lower surfaces 38, 40, respectively. Second mat 34 further defines fifth, sixth, seventh and eighth edges 42, 44, 46 and 48, respectively, of predetermined dimensions.

Third and fourth flexible walls 50, 52 extend upwardly from fifth and sixth edges 42, 44, respectively. A second plurality of vehicle carpet engaging projections or nubs 54 extend downwardly from second lower surface 40 of second base 36.

In accordance with the invention, the predetermined dimensions of fourth edge 26 and eighth edge 48 of mats 12 and 34 are predetermined lengthwise dimensions whereby second mat 34 can be positioned at least partially onto first mat 12 with a portion of second lower surface 40 resting on a portion of first upper surface 16.

The predetermined lengthwise dimension of fourth edge 26 is preferably greater than the predetermined lengthwise dimension of eighth edge 48 so that edges 24, 46 of the mats will be aligned with each other when the mats are positioned in partially overlapping relationship with each other and with third flexible wall 50 positioned immediately inside of first flexible wall 28.

Second plurality of projections 54 is located only adjacent to sixth edge 44 of second mat 34 so that a predetermined area 56 of second lower surface 40 adjacent to eighth edge 48 and between fifth and seventh edges 42, 46 is free of projections 54. Thus, predetermined area 56 can be slideably positioned over a portion of first upper surface 16 of first mat 12.

Second edge 22 and second flexible wall 30 of first mat 12 in system embodiment 10 preferably define an outwardly projecting area 58 which will fit at least partially under the vehicle's front passenger seat. End portions 60, 62 of mats 12 and 34, respectively, are elongated to flexibly fit over and rest upon the rear floor bump of most automobiles.

Floor mat system embodiment 10', illustrated in FIG. 2, is a mirror configuration of floor mat system embodiment 10. Features of system embodiment 10' which are identical to features of system embodiment 10 are identified in FIG. 2 by primed numbers corresponding to the numbers used to identify the corresponding elements of system embodiment 10 in FIG. 1.

Mats 12, 12', 34, 34' projections 32, 32', 54, 54' and walls 28, 28', 30, 30', 50, 50', 52 and 52' are comprised of injection molded thermoplastic material, such as styrene-butadiene rubber (SBR) or natural rubber-latex. If styrene-butadiene rubber (SBR) is used, it is preferred that it be comprised of substantially three parts butadiene and one part styrene.

Bases 14, 14', 36, 36' and walls 28, 28', 30, 30', 50, 50', 52 and 52' are each preferably from one-sixteenth inch to one-quarter inch thick, and the walls are each preferably from one inch to two inches in height. The materials used and the dimensions of the mats will provide the desired flexibility for the mats so that they will generally conform to the contours of the vehicle floor. Each of projections or nubs 32, 54 is preferably from one-eighth inch to one-quarter inch in length to provide the necessary grasping of the vehicle carpet to prevent sliding of mats 12, 34 on the vehicle carpet.

Figure 6:
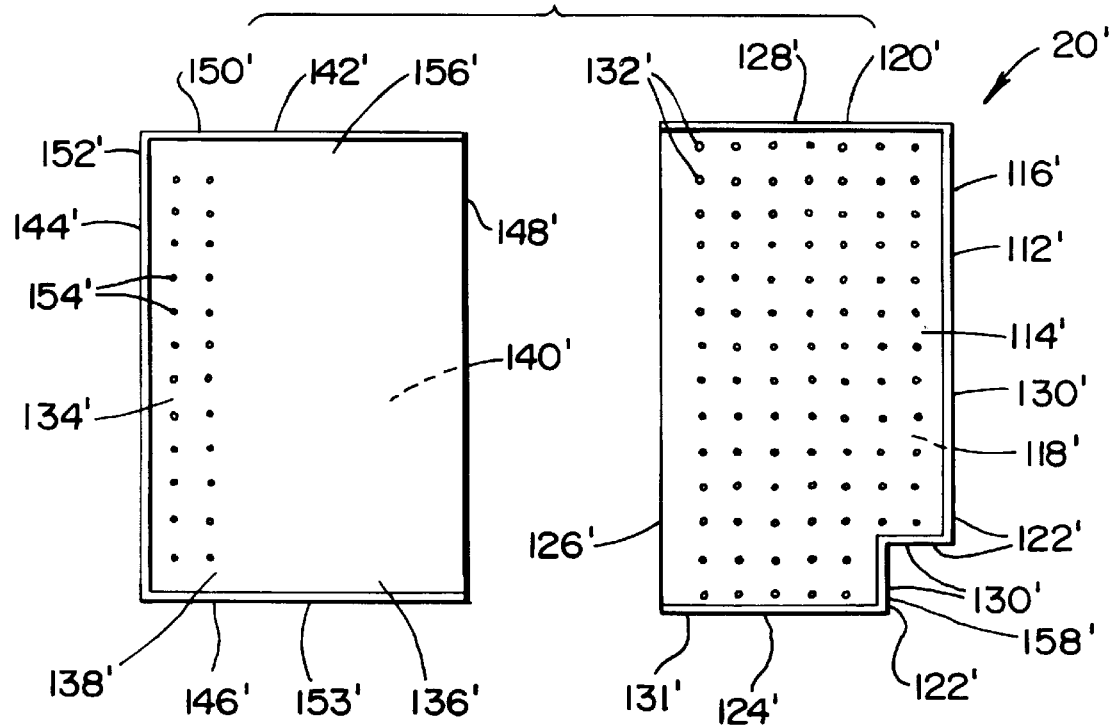
FIG. 6 is a top plan view of an embodiment of the floor mat system configured for use on the front passenger's side floor of a vehicle.

Another embodiment of an adjustable and removable accessory floor mat system for protecting front seat floors of vehicles is shown in FIGS. 4–6.

In accordance with the invention, a floor mat system 20 for protecting front seat, driver's side floors of vehicles is shown in FIGS. 4 and 5 and a system 20' for protecting front seat, passenger's side floors of vehicles is shown in FIG. 6.

With reference now to the embodiment shown in FIGS. 4 and 5, floor mat system 20 includes a first mat 112 having a first normally flat, flexible base 114 defining first upper and lower surfaces 116, 118, respectively. Mat 112 defines first, second, third and fourth edges 120, 122, 124 and 126, respectively, of predetermined dimensions. First and second flexible walls 128, 130 extend upwardly from first and second edges 120, 122, respectively. A third flexible wall 131 extends upwardly from third edge 124.

A first plurality of vehicle carpet engaging projections or nubs 132 extend downwardly from first lower surface 118 of first base 114.

Floor mat system 20 further includes a second mat 134 having a second normally flat, flexible base 136 which defines second upper and lower surfaces 138, 140, respectively. Second mat 134 further defines fifth, sixth, seventh and eighth edges 142, 144, 146 and 148, respectively, of predetermined dimensions.

Third and fourth flexible walls 150, 152 extend upwardly from fifth and sixth edges 142, 144, respectively. A seventh flexible wall 153 extends upwardly from seventh edge 146. A second plurality of vehicle carpet engaging projections or nubs 154 extend downwardly from second lower surface 140 of second base 136.

In accordance with the invention, the predetermined dimensions of fourth edge 126 and eighth edge 148 of mats 112 and 134 are predetermined lengthwise dimensions whereby second mat 134 can be positioned at least partially onto first mat 112 with a portion of second lower surface 140 resting on a portion of first upper surface 116. The predetermined lengthwise dimension of fourth edge 126 is preferably greater than the predetermined lengthwise dimension of eighth edge 148 so that flexible walls 150, 153 of mat 134 will be positioned immediately inside of flexible walls 128, 131, respectively, of mat 112.

Second plurality of projections 154 is located only adjacent to sixth edge 144 of second mat 134 so that a predetermined area 156 of second lower surface 140 adjacent to eighth edge 148 and between fifth and seventh edges 142, 146 is free of projections 154. Thus, predetermined area 156 can be slideably positioned over a portion of first upper portion 116 of first mat 112.

Second edge 122 and second flexible wall 130 of first mat 112 in system embodiment 20 preferably define an inwardly extending notch area 158 which will accommodate the left-hand seat portion of the driver's seat (not shown) when mat 112 is positioned on the front seat driver's side floor.

Floor mat system embodiment 20', illustrated in FIG. 6, is a mirror configuration of floor mat system 20. Features of system embodiment 20' which are identical to features of system embodiment 20 are identified in FIG. 6 by primed numbers corresponding to the numbers used to identify the corresponding elements of system embodiment 20 in FIGS. 4 and 5.

Mats 112, 112', 134, 134', projections 132, 132', 154, 154' and walls 128, 128', 130, 130', 131, 131', 150, 150', 152, 152', 153 and 153' are comprised of injection molded thermoplastic material, such as styrene-butadiene rubber (SBR) or natural rubber-latex. If styrene-butadiene rubber (SBR) is used, it is preferred that it be comprised of substantially three parts butadiene and one part styrene.

Bases 114, 114', 136, 136' and walls 128, 128', 130, 130', 131, 131', 150, 150', 152, 152', 153 and 153' are each preferably from one-sixteenth inch to one-quarter inch thick, and the walls are each preferably from one inch to two inches in height. The materials used and the dimensions of the mats will provide the desired flexibility for the mats so that they will generally conform to the contours of the vehicle floor. Each of projections or nubs 132, 132', 154 and 154' is preferably from one-eighth inch to one-quarter inch in length to provide the necessary grasping of the vehicle carpet to prevent sliding of mats 112, 112', 134 and 134' on the vehicle carpet.

In operation and use of embodiment 10, mat 12 is first placed onto the rear passenger's side carpeted floor of an automobile with projecting area 58 at least partially positioned beneath the rear portion of the front passenger's seat. End portion 60 of mat 12 is positioned over and onto the conventional floor bump 64 of the rear automobile floor. The length of end portion 60 should be sufficient to enable the end portion to cover more than one-half of the floor bump.

Second mat 34 is then positioned to cover a desired remaining exposed portion of the rear seat passenger's side carpeted floor of the automobile. The dimensions of mats 12 and 34 are such that a portion of mat 34 will be positioned onto mat 12.

When mat 34 is positioned to provide the desired coverage of the automobile carpeted floor, at least a portion of predetermined area 56 of mat 34 will be positioned on upper surface 16 of mat 12 with upright flexible wall 50 of mat 34 positioned immediately inside of upright flexible wall 28 of mat 12.

Because the lengthwise dimension of mat 12 is preferably greater than the lengthwise dimension of mat 34, edges 24, 46 of the mats will be substantially aligned with each other when the mats are positioned in partially overlapping relationship with each other and with flexible wall 50 positioned immediately inside of flexible wall 28.

Operation and use of embodiment 10' is identical to that described with respect to embodiment 10. However, when embodiments 10 and 10' are used together, as shown in FIG. 3, end portions 60', 62' of mats 12', 34' will, for example, rest upon end portions 60, 62 of mats 12, 34 in partially overlapping relationship over the vehicle's rear floor bump. In this configuration, mats 12', 34' would be positioned in overlapping relationship with respect to each other so that upright flexible wall 30' of mat 12' is positioned immediately inside of upright flexible wall 30 of mat 12 while upright flexible wall 52' of mat 34' is positioned immediately inside of upright flexible wall 52 of mat 34. Of course, the relative positionings of the mats could be such that mats 12, 34 would overlie portions of mats 12', 34', and upright flexible walls 30, 52 could be positioned immediately inside of upright flexible walls 30', 52', respectively.

Operation and use of embodiments 20, 20' are similar to that of embodiments 10, 10'. With respect to invention embodiment 20, however, the dimensions of mats 112, 134 are such that when a portion of predetermined area 156 overlies mat 112, flexible walls 150, 153 of mat 134 will be positioned immediately inside of upright flexible walls 128, 131, respectively, of mat 112.

Operation and use of embodiment 20' is identical to that of embodiment 20.

This invention provides for an adjustable accessory floor mat system for vehicles which can be quickly and easily adjusted to different sizes and shapes of vehicle floors and which create tray-like floor mats which prevent spilling of water and dirt off the sides of the mat when they are in use and as they are removed from the vehicle.

The invention in its broader aspects is not limited to the specific details shown and described, and departures may be made from such details without departing from the principles of the invention and without sacrificing its chief advantages.

What is claimed is:

1. An adjustable and removable accessory floor mat system for protecting floors of vehicles, said system comprising:

a first mat having a first normally flat, flexible base defining first upper and lower surfaces and first, second, third and fourth edges of predetermined dimensions;

first and second flexible walls extending upwardly from said first and second edges, respectively;

a first plurality of vehicle carpet engaging projections extending downwardly from said first lower surface of said first base;

a second mat having a second normally flat, flexible base defining second upper and lower surfaces and fifth, sixth, seventh and eighth edges of predetermined dimensions;

third and fourth flexible walls extending upwardly from said fifth and sixth edges, respectively;

a second plurality of vehicle carpet engaging projections extending downwardly from said second lower surface of said second base; and wherein said predetermined dimensions of said fourth and eighth edges of said mats are predetermined lengthwise dimensions, whereby said second mat can be positioned at least partially onto said first mat with a portion of said second lower surface resting on a portion of said first upper surface.

2. A system as in claim 1 wherein said predetermined lengthwise dimension of said fourth edge is greater than said predetermined lengthwise dimension of said eighth edge.

3. A system as in claim 2 wherein said second plurality of projections is located only adjacent to said sixth edge whereby a predetermined area of said second lower surface adjacent to said eighth edge and between said fifth and seventh edges is free of said second plurality of projections so that said predetermined area of said second lower surface can be slidably positioned over said first upper surface.

4. A system as in claim 3 wherein said first and second mats, all of said projections and all of said walls are comprised of styrene-butadiene rubber (SBR).

5. A system as in claim 4 wherein said styrene-butadiene rubber (SBR) is comprised of substantially three parts butadiene and one part styrene.

6. A system as in claim 5 wherein said first and second bases and all of said walls are each from one-sixteenth inch to one-quarter inch thick.

7. A system as in claim 6 wherein each of said projections is from one-eighth inch to one-quarter inch in length.

8. A system as in claim 3 wherein said first and second mats, all of said projections and all of said walls are comprised of natural rubber-latex.

9. A system as in claim 8 wherein said first and second bases and all of said walls are each from one-sixteenth inch to one-quarter inch thick.

10. A system as in claim 9 wherein each of said projections is from one-eighth inch to one-quarter inch in length.

11. A system as in claim 2 further comprising:

a third flexible wall extending upwardly from said third edge; and a seventh flexible wall extending upwardly from said seventh edge.

12. A system as in claim 11 wherein said second plurality of projections is located only adjacent to said sixth edge whereby a predetermined area of said second lower surface adjacent to said eighth edge and between said fifth and seventh edges is free of said second plurality of projections so that said predetermined area of said second lower surface can be slidably positioned over said first upper surface.

13. A system as in claim 12 wherein said first and second mats, all of said projections and all of said walls are comprised of styrene-butadiene rubber (SBR).

14. A system as in claim 13 wherein said styrene-butadiene rubber (SBR) is comprised of substantially three parts butadiene and one part styrene.

15. A system as in claim 14 wherein said first and second bases and all of said walls are each from one-sixteenth inch to one-quarter inch thick.

16. A system as in claim 15 wherein each of said projections is from one eighth inch to one-quarter inch in length.

17. A system as in claim 12 wherein said first and second mats, all of said projections and all of said walls are comprised of natural rubber-latex.

18. A system as in claim 17 wherein said first and second base and all of said walls are each from one-sixteenth inch to one-quarter inch thick.

19. A system as in claim 18 wherein each of said projections is from one eighth inch to one-quarter inch in length.

\* \* \* \* \*